United States Patent [19]

Cerniglia

[11] 3,885,466

[45] May 27, 1975

[54] EJECTION APPARATUS FOR A RAM BALER

[75] Inventor: Vincent J. Cerniglia, Wayne, Pa.

[73] Assignee: American Environmental Products Corp., Glassboro, N.J.

[22] Filed: Mar. 26, 1974

[21] Appl. No.: 455,006

[52] U.S. Cl. .............................................. 100/218
[51] Int. Cl. ............................................ B30b 15/32
[58] Field of Search ............................. 100/218, 255

[56] References Cited
UNITED STATES PATENTS

| 181,632 | 8/1876 | Brock | 100/218 X |
|---|---|---|---|
| 380,088 | 3/1888 | Calder | 100/218 |
| 1,040,396 | 10/1912 | Paal | 100/218 |
| 2,590,649 | 3/1952 | Reichert | 100/218 |
| 3,469,530 | 9/1969 | Walker et al. | 100/218 X |
| 3,677,175 | 7/1972 | Marvin | 100/218 X |

Primary Examiner—Billy J. Wilhite
Attorney, Agent, or Firm—Lee & Smith

[57] ABSTRACT

An apparatus utilizing a flexible connector, such as a cable, for ejecting a bale of compressed waste material from a ram baler employs at least one pivoted ejecting member disposed beneath the bale. The flexible connector is engageable with a hook on the ram or platen utilized to compress the waste material in order to pivot the ejecting member and eject the bale. A retaining and guide structure is employed to maintain the flexible connector in position to engage the hook on the platen, disengage the flexible connector from the hook after ejection of the bale, and provide a mechanical advantage for actuation of the ejecting member.

15 Claims, 7 Drawing Figures

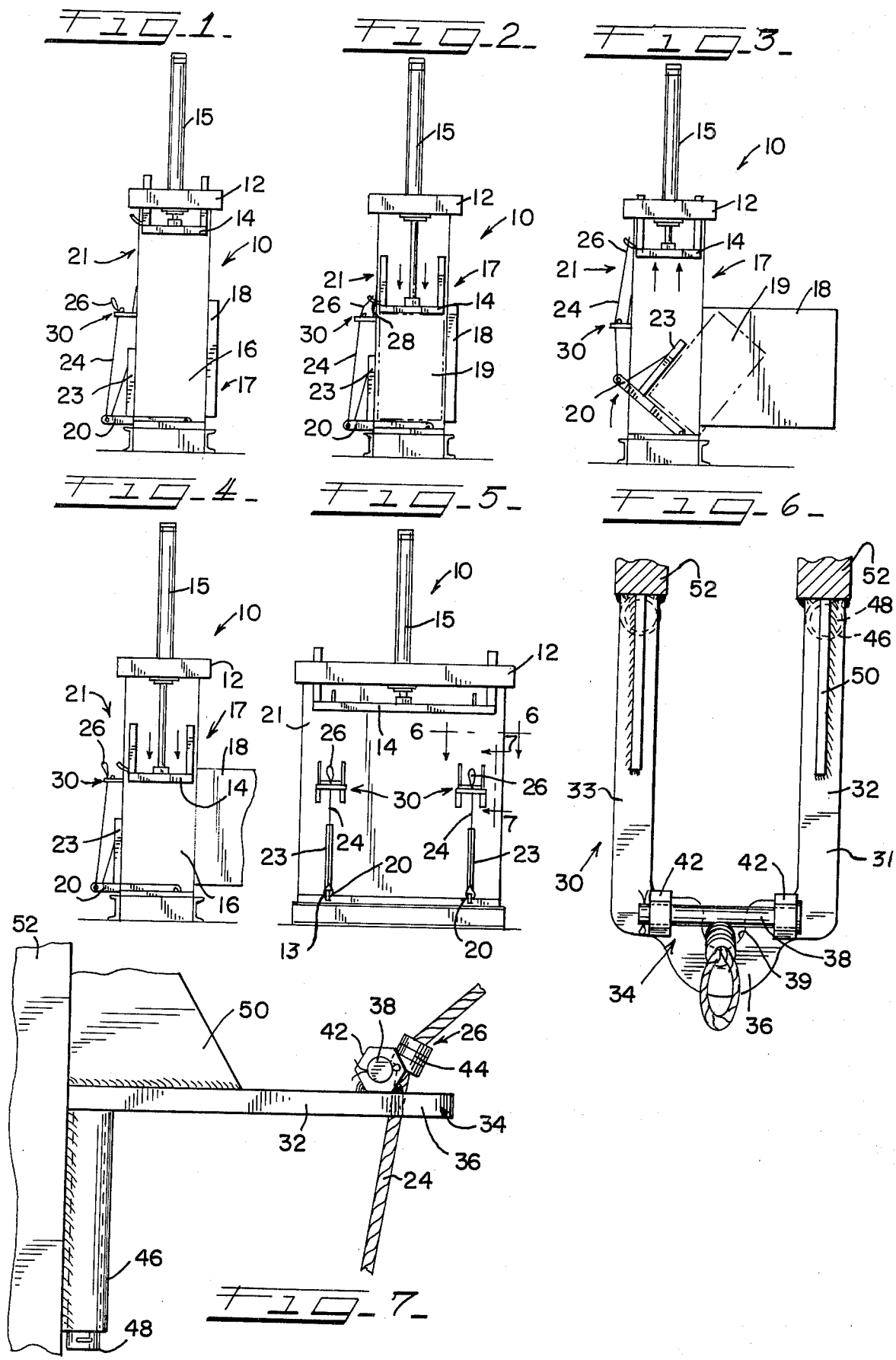

EJECTION APPARATUS FOR A RAM BALER

BACKGROUND OF THE INVENTION

1. Field of the Invention

This invention relates generally to a system for ejecting bales of waste material from ram balers, and more specifically, this invention relates to a semi-automatic apparatus for ejecting bales of waste material from vertical ram balers.

2. Description of the Prior Art

The ejection or removal of compacted material from a conventional baler having a compacting ram, which reciprocates in a generally vertical direction within a frame, has long been a problem. The weight of bales formed by compressing waste materials in these balers often exceeds seven hundred (700) pounds and, therefore, it is essential, both for safety and efficient handling, that bales be removed in a carefully controlled operation. Previous solutions to the problem of ejecting bales have ranged from the mechanical arrangement shown in Russian Pat. No. 144,725 - Nizkokhat, to the use of linked chains which are fastened to a front edge of the baler near the door, extended under the bale and fastened to the ram or platen. When the platen is raised, these chains are stretched taut, theoretically ejecting the bale. The problem with these chain devices, however, has been the amount of work required to eject the bale and the danger of breaking chains because of the large stresses exerted on them. In addition, such chains have not been controlled in their movement, have had to be re-rigged completely for each use, and have placed additional undesirable stresses on the platen.

One solution to these ejection problems has been presented in co-pending U.S. Pat. application Ser. No. 333,271 of Vincent J. Cerniglia, filed Feb. 16, 1973, entitled "Bale Ejection and Method of Making" and assigned to the same assignee as the present application. While the machine described in that application has been quite satisfactory in use, there is still a demand for an inexpensive, semi-automatic means of ejecting a bale which may be easily adapted to various types of existing balers, particularly smaller volume balers, and which is intended for use with balers using popular flexible type connectors, such as cables and chains. In ejectors employing such connectors, it is desirable to have a means of controlling the movement of the flexible connectors and to maintain them in a position ready for use, as well as reducing the strain applied to the connectors during operation.

SUMMARY OF THE INVENTION

The present invention involves a system for ejecting bales from a ram baler, such as a vertical ram baler, in which a bale ejection structure or ejecting member, such as one or more bale ejecting bars, is pivotably mounted on the baler frame and disposed below a compacting chamber defined by the frame. In the case of a vertical ram baler, the compacting chamber would normally be in the lowermost portion of the frame. The ejecting bar or bars may be located in channels in the bottom or floor of the compacting chamber and are actuated by a flexible connector or connectors attached thereto to eject the bales from the baler. The ejecting bars are connected at their rearward ends to the flexible connectors, such as cables, which are in turn connected by a hook engaging arrangement, such as loops in the connectors, to hooks provided on an upwardly moving ram or platen, so that when the platen is raised, the ejecting bars will be pivoted to eject the bale. This invention overcomes the problems of the prior art by a cable retaining and guide structure, which is mounted near the mid portion of the baler frame on the side of the frame opposite a door that may be opened to remove the bale. This retaining and guide structure extends outwardly from the frame in the form of a pair of rigid support arms having a bridging member with an opening to receive the flexible connector. A roller is rotatably mounted on the support arms and extends across the opening in the bridging member to limit the size of the opening such that the loop in the flexible connector cannot pass through. This means that the retaining and guide structure will hold the upper end or loop of the flexible connector or cable in readily accessible position to place the loop in engagement with the hook on the platen where it is desired to eject the bale. Moreover, the retaining and guide structure will serve as a guide for the flexible connector during ejection of the bale, thereby eliminating the wobble and undesirable horizontal or vertical movement typical of present non-rigid type connectors. In addition, the limited opening will result in disengagement of the loop from the hook after ejection of the bale. Finally, the retaining and guide structure, because of the length of its outward extension, will function as a pulley over which the cable passes, not only reducing the amount of work necessary to pivot the ejecting bars and eject the bale, but also reducing stresses on the ejecting bars and the platen.

Accordingly, it is an object of the present invention to provide a bale ejection system for a vertical ram baler which is easily operated in a semi-automatic manner to eject a compacted bale in a safe and controlled manner.

It is a further object of this invention to provide a semi-automatic bale ejection apparatus having a retaining and guide structure to hold and guide a flexible connector used to connect the vertical moving platen of the baler and the pivoted ejecting bars underlying and ejecting the bale.

It is one more object of the present invention to provide a semi-automatic bale ejection apparatus having a retaining means mounted on the baler which acts to maintain an upper portion of a flexible connector used in ejecting the bale in a readily accessible position during compression of the bale.

These and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a side elevational view of a vertical ram baler including the semi-automatic bale ejection apparatus of the present invention.

FIG. 2 is a side elevational view of the baler of FIG. 1 illustrating one position of the operating mechanism.

FIG. 3 is a side elevational view similar to FIG. 2 illustrating a second position of the operating mechanism.

FIG. 4 is a side elevational view similar to FIG. 2 illustrating a third position of the operating mechanism.

FIG. 5 is a rear elevational view of the vertical ram baler of FIG. 1 having the semi-automatic bale ejection apparatus of the present inventions.

FIG. 6 is an enlarged plan view of the cable retaining and guide means of the semi-automatic bale ejection apparatus of the present invention shown in FIG. 1.

FIG. 7 is a side elevational view of the cable retaining and guide means shown in FIG. 6.

DETAILED DESCRIPTION OF THE PREFERRED EMBODIMENT

Referring now to the drawings and, in particular, to FIG. 1, a vertical ram baler is shown in general at 10. Baler 10 includes a frame 12 on which is mounted a platen or ram 14 reciprocably movable in a vertical direction within the frame. Platen 14 is actuated by a hydraulic ram or platen cylinder 15. It should be recognized that while the invention is described with respect to the vertical ram baler 10, it may also have applicability in other types of environments.

The lowermost portion of the frame 12 defines a compaction chamber 16 into which the platen 14 is moved to compress waste material, such as cardboard or the like, which is placed within the chamber 16. One side of this compaction chamber 16 is defined by a door 18, which is mounted on a front portion 17 of the baler 10. The construction of such a vertical ram baler is in general well known and is set forth in more detail in the above-identified application Ser. No. 333,271, entitled "Bale Ejection System and Method of Making," filed Feb. 16, 1973 in the name of Vincent J. Cerniglia, and assigned to the same assignee as the present application, which is incorporated herein by reference.

In the operation of the vertical ram baler according to the present invention, waste material is placed in the compaction chamber 16 with the platen in an upward position, as shown in FIG. 1. At desired periods of time, the platen 14 is lowered into the compaction chamber 16 to compress the waste material into a generally rectangular bale 19, as shown in FIG. 2. The bale 19 at its bottom is supported on the bottom or floor of the baler, in which slots or channels 13 are formed. In these channels 13 are disposed elongated ejecting members, such as bale ejecting bars 20, which are pivotally mounted near the front 17 of the baler 10, adjacent door 18, and may have an upper or vertical leg 23 disposed adjacent a rear portion 21 of the baler 10, which is opposite door 18. Preferably, bale support bars 20 have a length greater than that of the bale so that each of the bale support bars 20, which are usually disposed in spaced parallel relationship in pairs in the position shown in FIGS. 1–5, extends beyond the rear 21 of the vertical ram baler. The amount of this extension is related to the extension of the retaining and guide structure, described in detail hereinafter, in such a way as to provide optimum performance.

When a proper bale height has been reached by repeated compression of the waste material, by the platen 14, a layer of cardboard is placed over the top of the bale for baling. The platen is then brought down to the top of the bale, to compress the bale, and shut off. The door 18 is then opened and bale wire or ties are placed around the bale and secured to maintain it in its generally rectangular configuration after it is ejected from the chamber. At this point, a cable 24 connected at one end to the outward end of the bale support bars, as shown in FIGS. 1–5, and having an opposite looped end 26 which is retained at a slight distance away from the rear 21 of the baler 10 is manually moved so that the looped end 26 of each cable 24 engages a platen hook 28 mounted on the upper face of platen or ram 14.

With the door 18 fully opened, the platen 14 is moved upwardly, moving the cable and thereby exerting an upward force at the rearward end of bale ejecting bars 20, which causes these bars to be angularly moved around their forward pivot point and thereby rotate the bale 19 forward until it is ejected under its own weight from the chamber. As may be seen from a comparison of FIG. 3 with FIG. 2, the movement of the cable 24 relative to the rear face 21 of the baler is significant. It has previously been a problem in this type of ejection system to maintain the connector or cable 24 in a position where it will not accidentally engage the rear face of the baler. It is also desirable to guide or track the connector in a true line in its upward movement and to reduce stress on the connector, whether it be a cable, as preferred, or a chain, which is possible. To prevent failure of the connector 24 due to the large stress exerted by pivoting bale ejecting bars 20 and, hence, the bale 19, the retaining and guide structure of the present invention achieves all the desired results and substantially reduces the stress on the connector because of its unique construction. This retaining and guide structure, shown generally at 30 in FIGS. 1–5, is shown in more detail in FIGS. 6 and 7. The retaining and guide structure 30 includes a platform or plate 32 formed in a generally U-shaped, which may be cut from one-half inch plates on a panograph machine. The U-shaped plate 32 has rigidly extending arms 31 and 33, with a bridging member 35 extending between the outermost ends thereof. The platform or plate 32 has at its outward end an eyelet portion 34, which is formed in bridging member 35 by a protruding lower lip-shaped guide loop 36 and an upper roller or guide bar 38, which is rotatably mounted in arms 31 and 33. Roller 38 extends between the arms 31 and 33 of the U-shaped platform 32 but across the protruding guide loop 36 and above it so that it forms an eyelet opening 39, through which cable 24 may pass.

The diameter or dimension of this opening 39, however, is such that the loop portion 26 of cable 24, which may be formed by clenching the free upper end of the cable 24 against a lower portion of the cable by means of a steel collar 44, is such that it is smaller than the diameter of either the collar 44 or the loop portion 26 and thereby will not allow either the collar 44 or loop portion 26 to pass downwardly through it. Fastened to the inward end of arms 31 and 33 of the platform 32, as shown in FIGS. 6 and 7, are parallel mounting legs 48, which may be formed of material such as three-fourth inch round steel and mounted underneath the platform, as shown, by appropriate means, such as welding. On the upper side of the platform 32, reinforcing or support gussets 50 are similarly mounted. The mounting legs may then be inserted into mounting tubes, such as 46, which are welded to the frame 12 of the baler 10 or to the channels 52, as shown in FIGS. 6 and 7, which normally form the rear wall of such a vertical ram baler. Gussets 50 will abut these channels to maintain the platform 32 in relatively horizontal position despite forces exerted during ejection. As shown in FIG. 3, the eyelet portion 34 of the container 30 is positioned at a point far enough outward from the rear face 21 of the baler 10 that as the cable 24 is moved upwardly by upward movement of the ram 14 and the cable 24 is guided through the opening 39, it will also be moved over roller 38, which is preferably a steel member such as a half-inch round, mounted by two nuts on opposite sides of lip 36, which are, in turn, welded to the upper platform 32. The smooth roller 38 allows the cable 24 to move freely over it, while its outward position causes it to act in a pulley-like fashion to help reduce the upward force necessary to pivot the bale support and eject the bale, and thereby reduce the direct axial stress on the cable 24 which might tend to otherwise shear the cable or chain being used as a connector.

The small dimension of the opening 39, as compared to the collar 44 and looped end 26 of the cable 24, as described above, uniquely acts to retain that portion of the cable 24 in a readily-available position subsequent to ejection, as shown in FIG. 4. Thus, when the bale has been ejected and the platen is returned, it is moved vertically downward until the baler is moved almost even with the retainer 30. At this point, the relatively stiff looped end 26 of the cable 24 will automatically disengage the platen hooks 28 since the small diameter eyelet 39 will not allow further downward movement of the looped end 26 to correspond to the downward position of the platen hooks 28. When disengaged, the retainer 30 will hold these looped portions 26 in readily-available position so that the operator, when next desiring to eject the bale, is able to quickly hook them over the platen hooks 28.

The cable retainer and ejection apparatus of this invention may be formed from any suitable materials which are strong and durable and resistant to shear stresses, which may be easily formed, molded, machined or cut to the desired shape. As is apparent from the above description, most of these materials are standard items and can be made very inexpensively so that the cost of this retainer 30 is relatively low. It can also be seen, because of the method of mounting the retainer on the baler described above, that this invention can be easily mounted on existing and in-place balers to achieve the desired results or, alternatively, can be directly welded without the use of mounting tubes 46 on new balers. It is also appreciated and recognized that other forms of connectors, such as chains, may be used rather than the cable preferred to accomplish the same results.

It should be understood that various modifications, changes, and variations may be made in the arrangements, operations and details of construction of the elements disclosed herein without departing from the spirit and scope of this invention.

I claim:

1. In a ram baler having a frame defining a compacting chamber, a platen reciprocable to compress waste material in the compacting chamber into a bale, and a door to provide access to the compacting chamber to remove the bale, a semi-automatic ejection apparatus comprising:

bale ejection means mounted on the frame and adapted to contact the bale of waste material during ejection thereof;

a flexible connector having one end thereof secured to said bale ejection means;

hook means on the platen;

hook engaging means at the other end of said flexible connector, said hook engaging means being engaged with said hook means when the waste material has been compacted into a bale and the door has been opened, the succeeding stroke of the platen causing said bale ejection means to be actuated to eject the bale through the open door; and retaining means to maintain said hook engaging means in a position to be engaged with said hook means while disengaged therefrom and to disengage said hook engaging means from said hook means upon the stroke of the platen after the bale has been ejected from the baler.

2. An apparatus as claimed in claim 1 and further comprising guide means to restrict the movement of said flexible connector and to provide a mechanical advantage to reduce the amount of energy expended in ejecting the bale.

3. An apparatus as claimed in claim 2 wherein said guide means provides a mechanical advantage by producing a pulley action.

4. An apparatus as claimed in claim 2 wherein said retaining means comprises:

a pair of rigid support arms extending outwardly from the frame; and a bridging member extending between the ends of said support arms and having an opening therein to receive said flexible connector.

5. An apparatus as claimed in claim 4 wherein said guide means comprises a roller mounted for rotation adjacent the opening in said bridging member to position said flexible connector in the opening and to provide a pulley action during ejection of the bale.

6. An apparatus as claimed in claim 1 wherein said bale ejection means comprises at least one bale ejection member pivoted for actuation by said flexible connector.

7. An apparatus as claimed in claim 6 wherein said bale ejection members comprise parallel bale ejecting bars located at the bottom of the compacting chamber and pivotably mounted adjacent the door, whereby an upward stroke of the platen with said hook engaging means engaged with said hook means results in said bale ejecting bars being pivoted to eject the bale through the door.

8. An apparatus as claimed in claim 1 wherein said hook engaging means comprises a loop in said flexible connector positioned such that said retaining means prevents said loop from passing through said retaining means in the direction that said flexible connector extends toward said bale ejection means.

9. In a vertical ram baler having a frame defining a compacting chamber in the lowermost portion thereof, a platen reciprocable to compress waste material in the compacting chamber into a bale, and a door to provide access to the compacting chamber to remove the bale, a semi-automatic ejection apparatus comprising:

a bale ejecting bar located at the bottom of the compacting chamber, said bale ejecting bar having one end pivotably mounted adjacent the door;

a flexible connector fastened to the end of said bale ejecting bar away from said pivotable mounting;

a pair of rigid support arms extending outwardly from the side of the frame away from the door;

a bridging member extending between the ends of said support arms and having an opening therein through which said flexible connector is passed;

a roller rotatably mounted on said support arms and extending across said opening in said bridging member in contact with said flexible connector;

a loop formed in the end of said flexible connector that is not connected to said bale ejecting bar and positioned with said bridging member between said loop and said bale ejecting bar; and a hook on the platen, said loop being engageable with said hook, said bridging member and said roller maintaining said loop in position to be engaged with said hook for ejecting the bale, disengaging said loop from said hook after ejection of the bale, and providing a pulley action to reduce the energy expended in ejecting the bale.

whereby after the waste material has been compacted into a bale, the door has been opened, and the platen is at the bottom of its downward stroke, said loop is engaged with said hook and the upward stroke of the platen will cause said ejecting bar to be pivoted to easily eject the bale.

10. An apparatus as claimed in claim 9 and further comprising at least one additional bale ejecting bar with the associated flexible connector having a loop, rigid support arms, bridging member, roller and hook.

11. An apparatus as claimed in claim 10 wherein said bale ejecting bar has a vertical leg adjacent the side of the bale opposite the door.

12. An apparatus as claimed in claim 10 wherein said bale ejecting bar extends beyond the side of the compacting chamber away from the door by a distance that is determined by the extension of said support arms to provide the maximum mechanical advantage.

13. A vertical ram baler comprising:
a frame defining a compacting chamber in the lowermost portion thereof;
a platen reciprocable to compress waste material in said compacting chamber into a bale;
a door formed in one side of said frame to provide access to the compacting chamber to remove the bale;
at least one longitudinal channel formed in the bottom of said compacting chamber running from said door to the opposite side of said compacting chamber;
an ejecting bar located in said channel, said ejecting bar being pivotably mounted at one end in said frame adjacent said door and being normally positioned below the bottom of said compacting chamber;
a flexible connector fastened to the other end of said ejecting bar;
a loop formed in the end of said flexible connector away from said ejecting bar;
a hook on said platen engageable with said loop of said flexible connector;
retaining a guide means on said frame to maintain said loop in position to be engaged with said hook, to disengage said loop from said hook after ejection of the bale, and to provide a mechanical advantage to reduce the energy expended in ejecting the bale;
whereby after the waste material in said compacting chamber has been compressed into a bale, the bale may be ejected by positioning said platen at the extremity of its downward stroke, engaging said loop with said hook, opening said door and actuating said platen to eject the bale by pivoting said ejecting bar upon the upward stroke of said platen.

14. A baler as claimed in claim 13 wherein:
a plurality of longitudinal channels are formed in the bottom of said compacting chamber;
an ejecting bar is located in each of said channels;
a flexible connector is fastened to each of said ejecting bars;
a plurality of hooks are located on said platen, each hook being engageable with a corresponding one of said flexible connectors; and
a plurality of retaining and guide means are on said frame, each of said retaining and guide means being associated with a corresponding one of said flexible connectors.

15. A baler as claimed in claim 13 wherein said retaining and guide means comprises:
a pair of rigid support arms mounted on said frame and extending outwardly from the side away from said door;
a bridging member extending between the ends of said support arms and leaving an opening therein through which said flexible connector is passed; and
a roller rotatably mounted on said support arms and extending across said opening in said bridging member in contact with said flexible connector.

* * * * *